(12) United States Patent
Stubben

(10) Patent No.: US 6,283,475 B1
(45) Date of Patent: Sep. 4, 2001

(54) APPARATUS AND METHOD FOR CRANE GAME CLAW CONTROL

(75) Inventor: David R. Stubben, Cameron Park, CA (US)

(73) Assignee: Smart Industries Corporation, Des Moines, IA (US)

( * ) Notice: Subject to any disclaimer, the term of this patent is extended or adjusted under 35 U.S.C. 154(b) by 0 days.

(21) Appl. No.: 09/421,186

(22) Filed: Oct. 19, 1999

(51) Int. Cl.[7] .................................................. A63F 9/24
(52) U.S. Cl. ............................. 273/448; 273/447; 463/7
(58) Field of Search ............................ 273/448, 447, 273/440, 138 R, 138.1, 138.2; 221/210, 220; 212/312; 463/7

(56) References Cited

U.S. PATENT DOCUMENTS

| | | | |
|---|---|---|---|
| 4,684,128 | * | 8/1987 | Verstraeten . |
| 4,685,673 | * | 8/1987 | Verstraeten . |
| 4,718,667 | * | 1/1988 | Shoemaker, Jr. . |
| 4,778,176 | * | 10/1988 | Shoemaker, Jr. . |
| 5,271,628 | * | 12/1993 | Okada . |
| 5,358,219 | * | 10/1994 | Shenk et al. . |
| 5,397,134 | * | 3/1995 | Fishman et al. . |
| 5,415,417 | * | 5/1995 | Reis, Jr. . |
| 5,533,726 | * | 7/1996 | Nordman et al. . |
| 5,678,823 | * | 10/1997 | Chaffee et al. . |
| 5,700,007 | | 12/1997 | Kelly et al. . |
| 5,833,236 | * | 10/1998 | Oursler et al. . |
| 5,855,374 | * | 1/1999 | Shoemaker, Jr. . |
| 5,967,892 | * | 10/1999 | Shoemaker, Jr. . |
| 6,062,567 | * | 5/2000 | Uetono et al. . |
| 6,139,429 | * | 10/2000 | Shoemaker et al. . |
| 6,152,447 | * | 11/2000 | Stanley . |

OTHER PUBLICATIONS

U.S. Patent Bibliography Database Abstract; of U.S. Patent 5,700,007, issued Dec. 23, 1997; (1 page).
SGS–Thomson Microelectronics solenoid specification publication; dtd. 10/91; pp. 1–8.
Maxim digital to analog specification publication; dtd. 6/95; pp. 1–12.
National Semiconductor analog to digital specification publication; dtd. Unknown; pp. 3–115/3–139.

* cited by examiner

Primary Examiner—Michael O'Neill
(74) Attorney, Agent, or Firm—Zarley, McKee, Thomte, Voorhees & Sease

(57) ABSTRACT

An improved claw control system for use in a coin operated crane game. In one embodiment, this system allows operation of the claw solenoid in a precise manner in which the DC claw current is digitally controlled. A microcomputer can be used to read a potentiometer setting via an analog to digital converter. The microcomputer outputs a command current to the solenoid via a digital to analog converter and a solenoid driver.

48 Claims, 9 Drawing Sheets

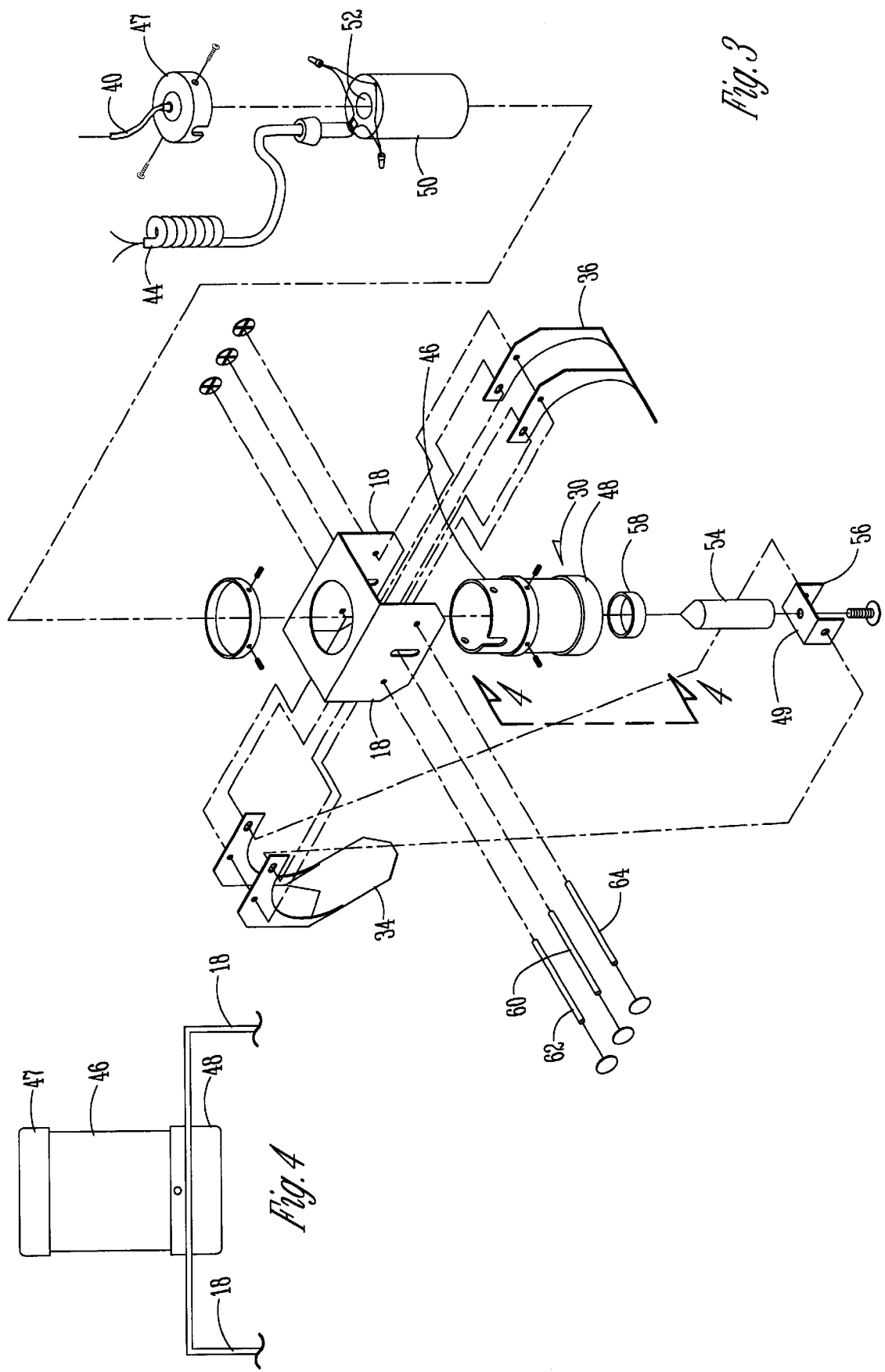

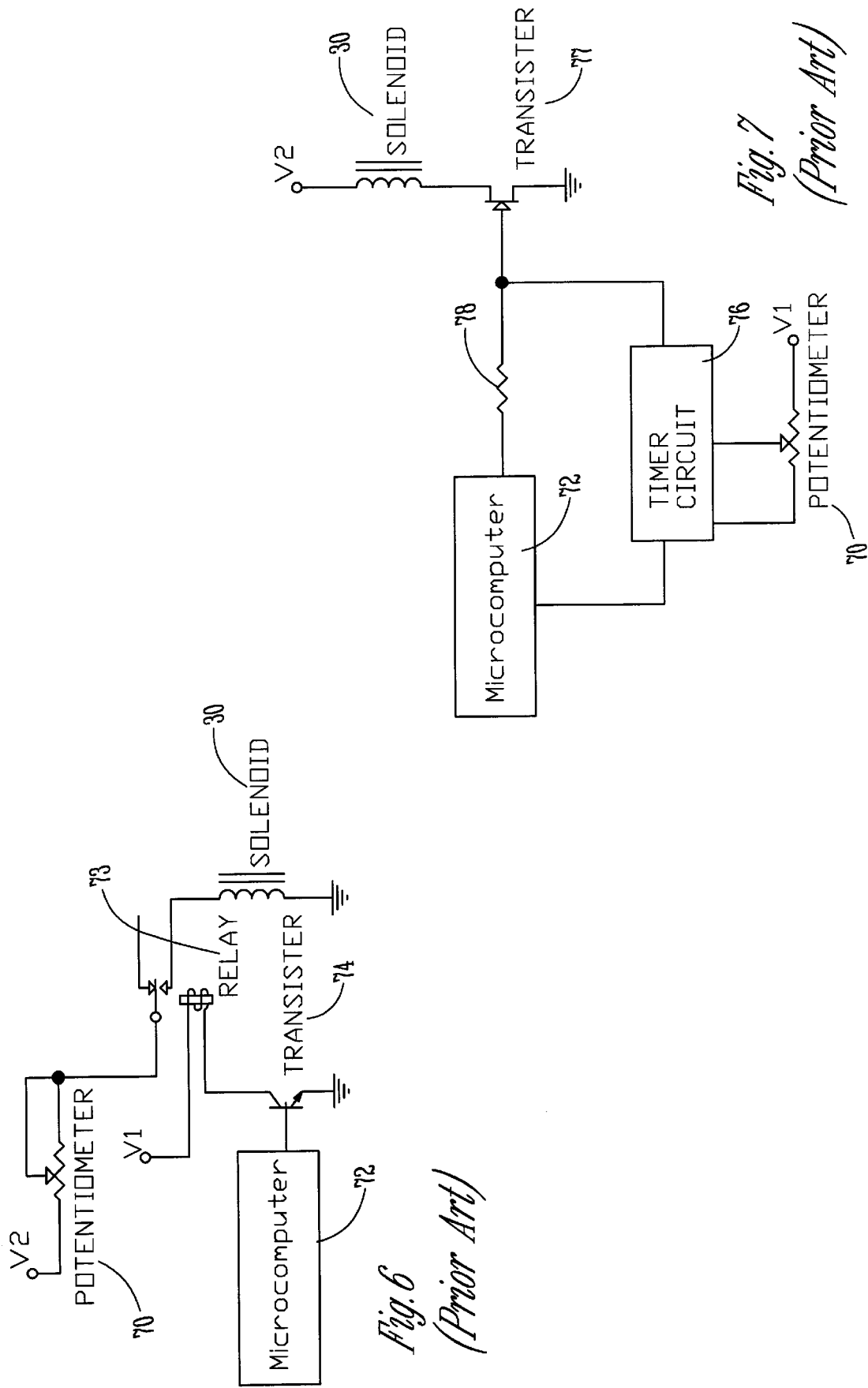

APPARATUS AND METHOD FOR CRANE GAME CLAW CONTROL

BACKGROUND OF THE INVENTION

1. Field of the Invention

This invention relates to money-operated games and, in particular, to games utilizing a claw with an operator-positionable crane to attempt to pick up prizes, including the way in which the claw's strength is controlled.

2. Problems in the Art

A coin operated crane game consists of an electronic control system and a mechanical system that allows a player to purchase a chance to win a prize by skillful manipulation of player controls. The controls consist of a joystick and/or buttons, which are activated by the insertion of coins or cash into the game. These controls allow the player to move a crane head in front/back and left/right positions and then drop a claw which will pick up prize merchandise if skillfully and properly manipulated. When the claw drops to the bottom of its travel, the control electronics closes the claw, raises the claw, positions its over a prize delivery shoot and releases the prize if it is held by the claw. Motors are used to move the crane head and to move the claw up and down. The claw is activated by a solenoid. This invention concerns the control of that solenoid. The equipment operator presets the nominal strength of that solenoid so that the skill level required to win is consistent with the business economics of operating the equipment.

It is of course preferable to have a game of this type be economically profitable. If the claw strength were unlimited, or at least maximized, the winning of prizes could approach being automatic. This would skew the factors of skill and chance towards the player, which could severely restrict or even defeat profitability of the game.

Therefore, to make the game have a reasonable level of skill and chance, and to allow game owner profitability, claw-gripping strength can be adjustable.

A first prior art example of a way to operate and adjust gripping strength of the claw uses a relay and a power potentiometer, as shown in FIG. 6, to control the solenoid, which in turn determines gripping strength of the claw. A microcomputer controls the relay. This design has relay and potentiometer failures at a higher than desired rate. Also, this design is susceptible to undesirable variations of claw strength due to variations of line voltage and power supply load changes (from motor operation, etc.).

A second example of prior art uses a timer circuit to pulse width modulate the solenoid drive to control claw-gripping strength, as shown in FIG. 7. The timer circuit is itself controlled by a potentiometer. A microcomputer enables the timer circuit at the appropriate time. This system has significant voltage noise due to the rapid switching of the solenoid to control its current and a lack of precision due to the nature of the timer control circuit. Also, this design, like the first example of FIG. 6, is susceptible to undesirable variations of claw strength due to variations of line voltage and power supply load changes (from motor operation, etc.).

It can therefore be seen that the state of the art utilizes voltage control for energizing the solenoid. These methods have been found to have weaknesses. Therefore, there is a real need for improvement in the art.

It is therefore a principal object of the present invention to provide an apparatus and method for crane game claw control that improves over or solves the problems and deficiencies in the art.

Another object of the present invention is to provide an apparatus and method as above described which overcomes the problems associated with variations of line voltage, power supply load changes, and voltage noise.

Other objects, features, and advantages of the present invention include:
a. Increased reliability of operation and electrical components;
b. Improved level of control of claw gripping strength;
c. Improved control of game pay out;
d. Improved flexibility of control and operation;
e. Improved economics, efficiency, and durability.

These and other objects, features and advantages of the present invention will become more apparent with reference to the accompanying specification and claims.

SUMMARY OF THE INVENTION

The invention includes an apparatus and method for crane game claw control. The apparatus comprises, in a crane game, a moveable claw with closeable jaws, an electrical actuator mechanically connected to the claw, an actuator driver electrically connected to the actuator adapted to issue an electrical current proportional to desired gripping strength to the actuator.

The method includes selecting a desired claw gripping strength, creating an electrical signal representative of said desired gripping strength, delivering the signal to an electrically controlled actuator connected to the claw (the signal being in the form of a current), and monitoring the current during a gripping period.

An optional feature of the invention includes a gripping strength control that can be manually adjusted by the owner or operator of the game.

BRIEF DESCRIPTION OF THE DRAWINGS

FIG. 3 is an exploded perspective view of FIG. 2.

FIG. 4 is an isolated view taken along line 4—4 of FIG. 3.

FIG. 6 is an electrical schematic of a prior art claw control circuit.

FIG. 7 is an electrical schematic of another prior art claw control circuit.

DETAILED DESCRIPTION OF THE PREFERRED EMBODIMENT

Figure 1:
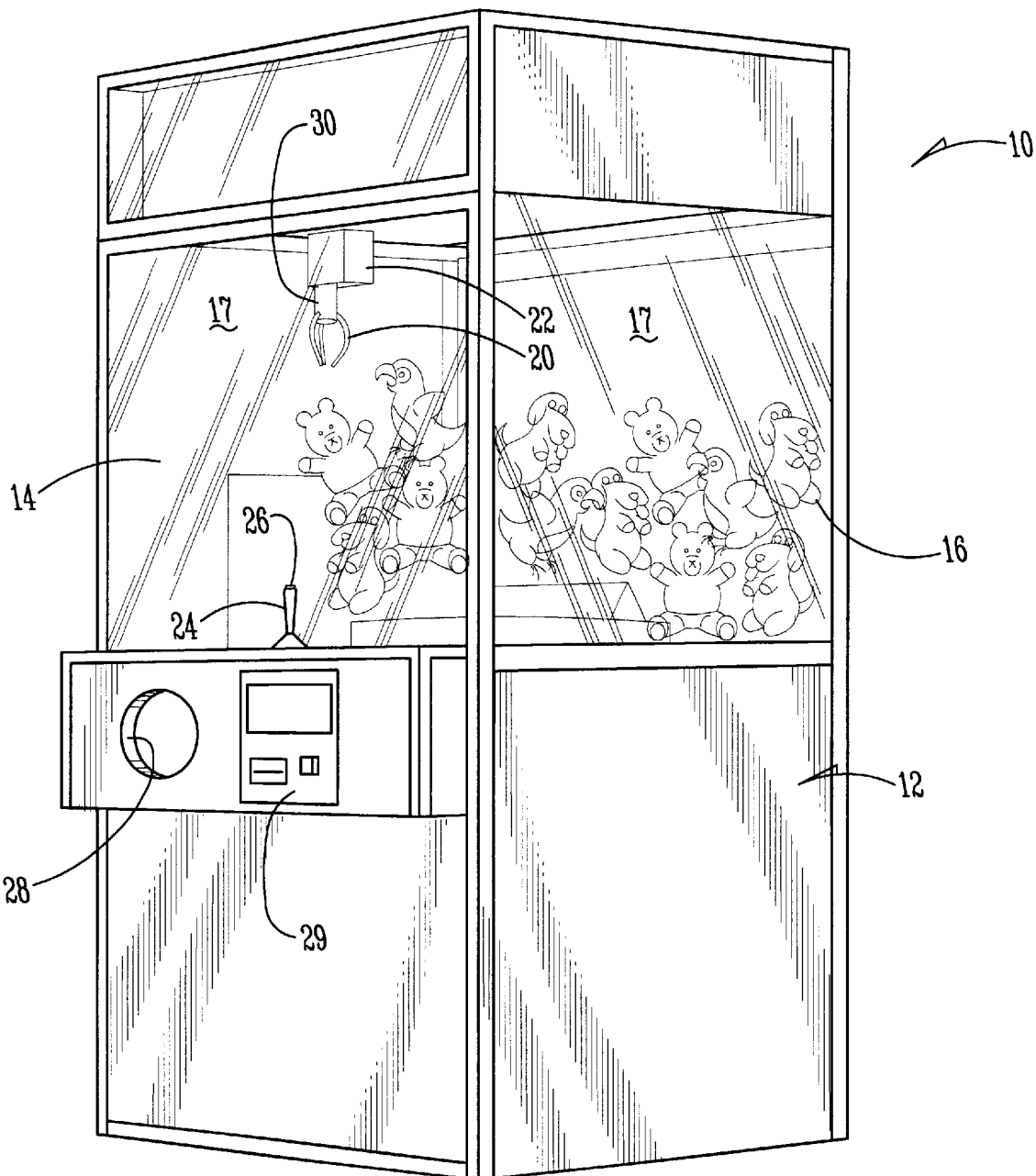
FIG. 1 is a perspective view of a crane game machine.

In order to obtain a better understanding of the invention, a detailed description of preferred embodiments will now be set forth. Frequent reference will be made to the drawings. References numbers and letters will be used to indicate certain parts and locations in the drawings. The same reference numbers or letters will be used to indicate the same parts and locations throughout the drawings unless otherwise indicated.

FIG. 1 illustrates generally a crane game 10 according to the present invention. A housing 12 defines an enclosed chamber 14 with prizes 16 (here stuffed animals, for example) distributed therein. Transparent windows 17 of housing 12 allow a player to view prizes 16 without having direct access to them.

A claw 20 is connected to a crane 22. As is well-known in the art, a player control 24 (e.g. joy stick) is used by a player to move crane 22 in an x-y plane (generally horizontal) relative to prizes 16 within chamber 14. The player picks out a prize 16 and attempts to position claw 20 vertically over a selected prize 16. Another manual player control, such as button 26, causes crane 22 to drop claw 20 down with the claw jaws open, close the jaws, and lift claw 20 upward. If the skill of the operator at positioning claw 20 is successful and claw 20 drops in such a position that its jaws grasp at least a portion of prize 16, and the jaws' grasping strength is sufficient to hold prize 16 when lifted, the operator either moves crane 22 to a position, or game 10 automatically moves crane 22 to position where claw 20 would open and drop prize 16 into an outlet chute 28 where it could be grabbed by the player.

A money handler, such as a coin receiver and changer 29, is incorporated in game 10. A player deposits an appropriate amount of money to have a chance at obtaining a prize 16.

Figure 2:
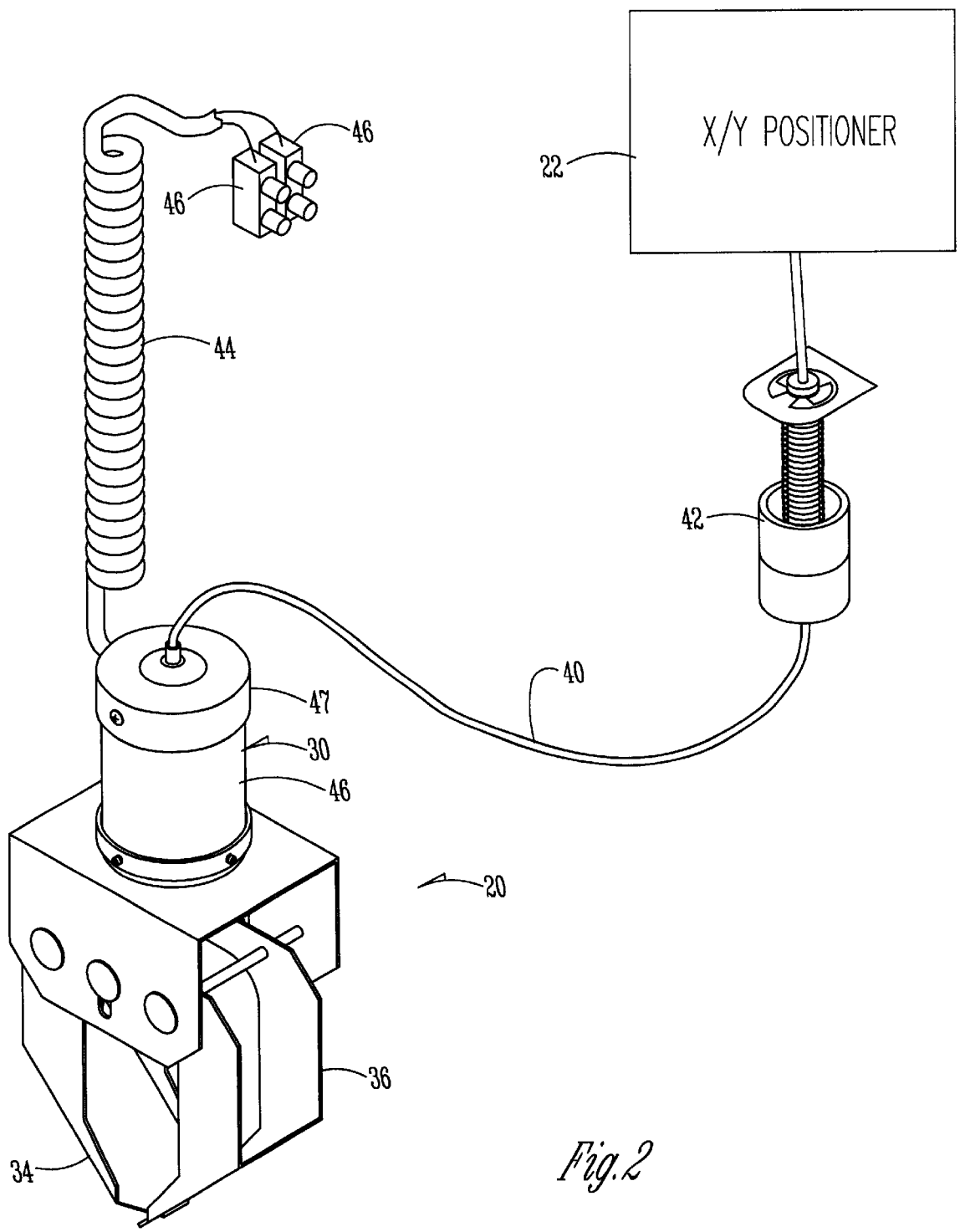
FIG. 2 is an enlarged isolated perspective and partial diagrammatic view of the crane game claw.

FIG. 2 illustrates diagrammatically crane 22 and its ability to move in the X and Y directions, where X and Y lie in a horizontal plane. Claw 20 consists of a housing 46, a first jaw 34 and a second opposing jaw 36. A cable 40 is attached between claw housing 32 and a motor 42 which lengthens or shortens cable 40 relative to crane 22. A solenoid 30 is positioned inside housing 32 and serves to close jaws 34 and 36 towards one another and provide a gripping force for those jaws. An electrical cable 44 extends from solenoid 30 to a connection block 46. Cable 44 transmits electrical energy to solenoid 30 to provide gripping force.

FIG. 3 shows claw 20 in exploded form. Solenoid 30 essentially consists of a solenoid housing 46 with fixed end caps 47 and 48 at opposite ends (see also FIG. 4). Cable 40 to motor 42 is fixed to cap 47. A yoke 18 is fixed to bottom end cap 48 of solenoid housing 46.

A solenoid core 50 is enclosed in solenoid housing 46 and includes a center aperture or void 52 into which ferromagnetic solenoid shuttle 54 fits. Bracket 56 is connected to the bottom of shuttle 54. A retaining ring 58 secures shuttle 54 within core 50.

A center pivot pin 60 extends through openings in both sides of jaws 34 and 36, and bracket 56. Side pins 62 and 64 extend through the apertures in yoke 18 and jaws 34 and 36, as shown in FIG. 3.

Figure 5A:
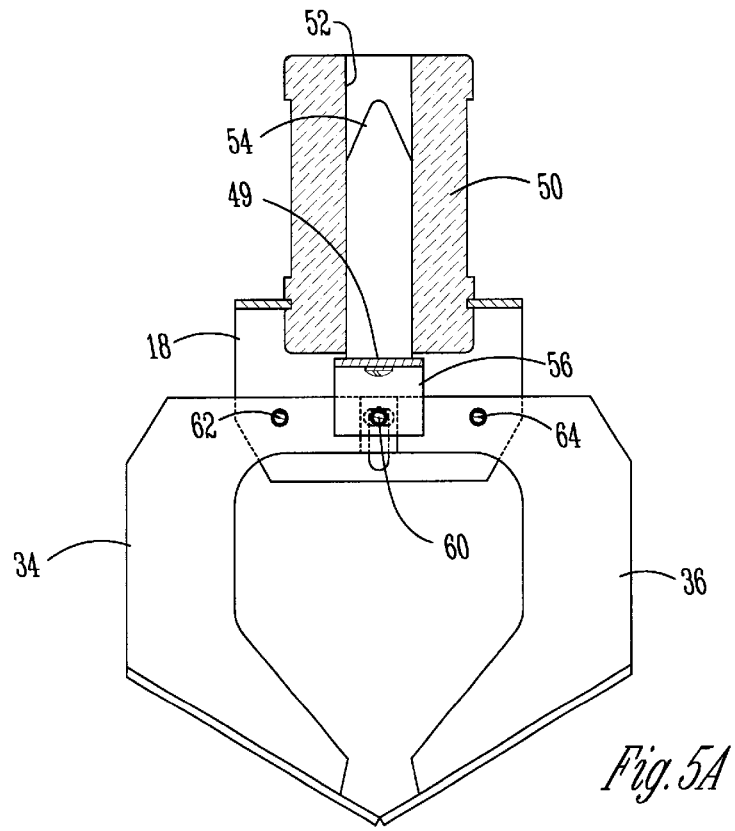
FIGS. 5A and 5B are enlarged partial sectional views of the claw of FIG. 3 and the actuator for gripping strength of the claw.
Figure 5B:
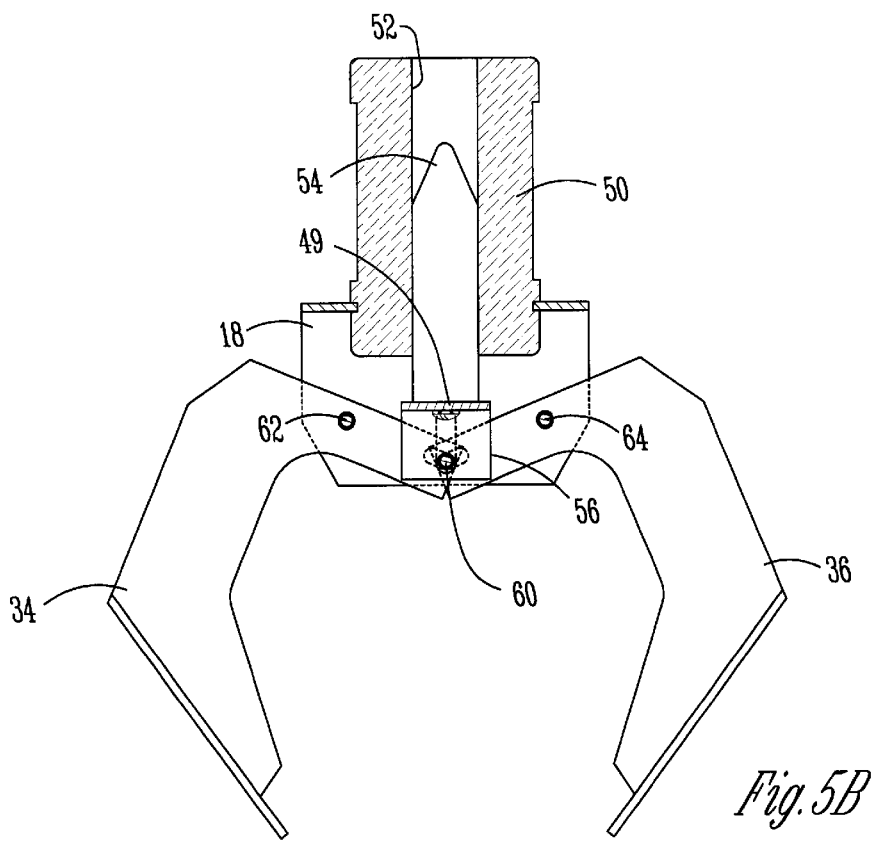

As shown in FIGS. 5A and 5B, when shuttle 54 is in a lower-most position (FIG. 5B), pivot pin 60 is in a lowest position relative to yoke 18, which is fixed in relation to solenoid core 50. Jaws 34 and 36 are therefore open. When solenoid core 50 is actuated by passing current through coil 60, ferromagnetic shuttle 54 is drawn upward into core 50 which in turn moves pivot pin 60 upward relative to core 50 and closes jaws 34 and 36 (see FIG. 5A).

It is to be understood that the gripping strength of jaw 34 relative to jaw 36 is a function of the magnetic attraction of electromagnet 50/66 to ferromagnetic core 54. Any force tending to push jaws 34 and 36 apart, which exceeds the attraction force of solenoid electromagnet 50/66 to shuttle 54, would exceed the gripping force of claw 20 and cause the loss of grip on a prize 16.

It is to be further understood that the gripping force of solenoid 30 is a function of the amount of electrical energy introduced into coil 66.

As referred to above, gripping force of claw 20 cannot be infinite, and in fact, it is desired to be adjustable in a manner which does not allow a grip to be maintained in any circumstance. As is known in the art, gripping force adjustment for claw 20 allows the owner and/or operator of game 10 to introduce an element of chance into the game, adjust the level of skill required to obtain the prize 16, and adjust the pay out percentage of the game in a manner that provides reasonable odds of success for a variety of players while at the same time providing a reasonable profit from the game to the game owner.

In order to achieve this balance of player versus game owner goals, it is beneficial to be able to set gripping force of claw 20. The state of the art has utilized a variety of methods to control voltage to solenoid 30, as the mechanism to control gripping force of claw 20. As discussed with respect to the state of the art, FIGS. 6 and 7 illustrate prior art methods of voltage control of solenoid 30.

In FIG. 6, potentiometer 70 which controls the amount of voltage available through relay 73 to solenoid 30. A voltage V2 is available. Potentiometer 70 alters the amount of voltage by a manual control which can be set by the game owner, such as known in the art. A microcomputer 72 controls a transistor 74 which closes the contact on relay 73 when solenoid 30 is to be energized (i.e. when gripping force should be provided to claw 20). Voltage V1 is available to close the contact of relay 73.

As discussed previously, this configuration is susceptible to fluctuations of line voltage V2 or load. Such variations could alter the actual voltage energizing solenoid 30 and thus alter the actual gripping force of claw 20. This could adversely affect the desired pay out of game 10. Furthermore, it is susceptible to component failure, such as relay 73 or potentiometer 70.

FIG. 7 shows another prior art attempt at dealing with claw control. Voltage V2 is available to energize solenoid 30. Potentiometer 70 is used to allow manual setting of a desired claw grip force. In this instance, however, potentiometer 70 adjusts a timer circuit 76. Microcomputer 72 in conjunction with timer circuit 76 enables the gate of a transistor 70 to pulse width modulate the amount of voltage V2 through solenoid 30. This embodiment does not involve a component such as relay 73 in the conducting path of voltage V2. Similarly, potentiometer 70 is not in that conducting path. However, this configuration is subject to significant noise because of switching of the solenoid. It also lacks precision and control.

Figure 8:
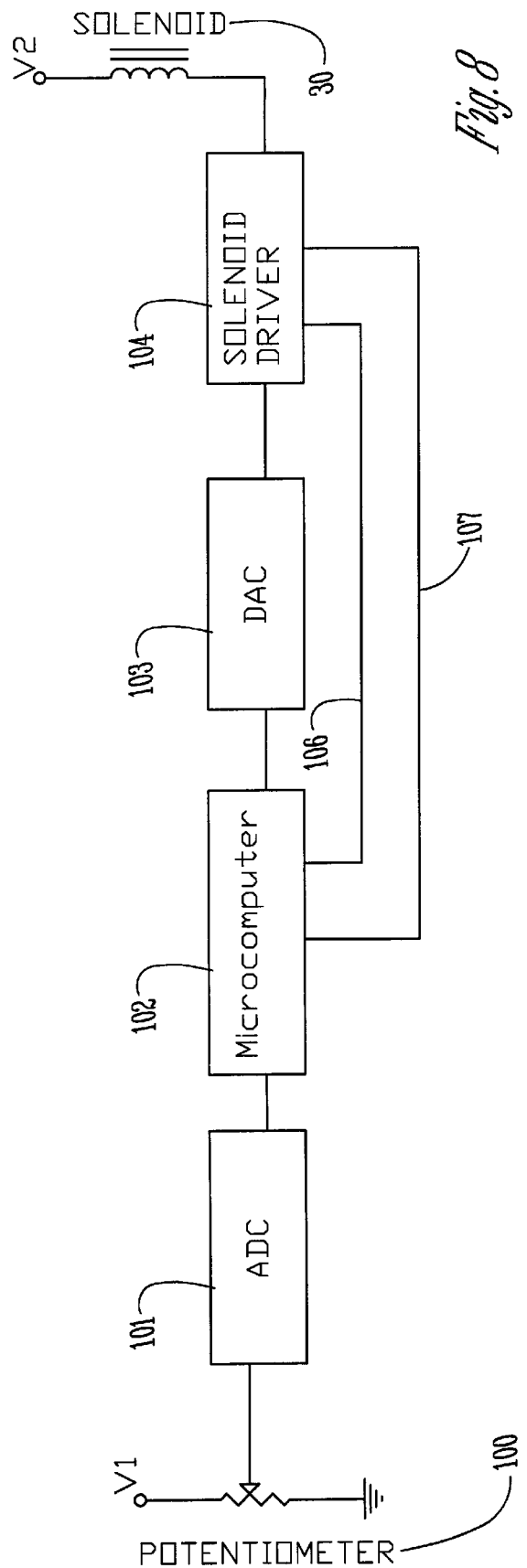
FIG. 8 is an electrical schematic in block diagram form of a preferred embodiment according to the present invention.

In comparison, a preferred embodiment of claw control according to the present invention is set forth at FIG. 8. A potentiometer 100 is read by microcomputer 102 and which results in a value of current that is desired in solenoid 30 when it is activated. Microcomputer 102 outputs this value to circuitry that precisely controls the current in solenoid 30. The current is directly proportional to the strength (force) of solenoid 30. By controlling the current of the solenoid 30, instead of controlling the voltage or average voltage across solenoid 30 (as in the prior art), system voltage line and load variations do not affect the strength of solenoid 30.

Referring to FIG. 8, a potentiometer 100 is connected to an Analog to Digital Converter (ADC) 101 that in turn is connected to microcomputer 102. Microcomputer 102 is connected to a Digital to Analog Converter (DAC) 103 that in turn is connected to a solenoid driver 104. Solenoid driver 104 is connected to solenoid 30. The output of the DAC 103 is a voltage. Solenoid driver 104 includes a transconductance amplifier that converts the input voltage to output current and utilizes current feedback to maintain this current in a constant manner. The part used is an SGS Thompson L294. When the game is powered up the potentiometer 100 is read by the microcomputer 102 via the ADC 101. The value read is stored in the microcomputer's memory until needed. When it becomes time to activate the claw in the game play, microcomputer 102 outputs the value to DAC 103 and enables solenoid driver 104. To open the claw, microcomputer 102 disables solenoid driver 104 via control line 106. Microcomputer 102 also has a control line 107 to force solenoid driver 104 to maximum current if it desires.

Thus, potentiometer 100 is not in the current path of voltage V2 that energizes solenoid 30. There are no other electrical mechanical parts subject to failure. The circuit is not subject to line variations, noise, or load. It delivers a repeatable, precise energization of solenoid 30 for improved performance of game 10.

It will be appreciated that the present invention can take many forms and embodiments. The true essence and spirit of this invention are defined in the appended claims, and it is not intended that the embodiment of the invention presented herein should limit the scope thereof. Variations obvious to one skilled in the art will be included within the invention defined by the claims.

Figure 9:
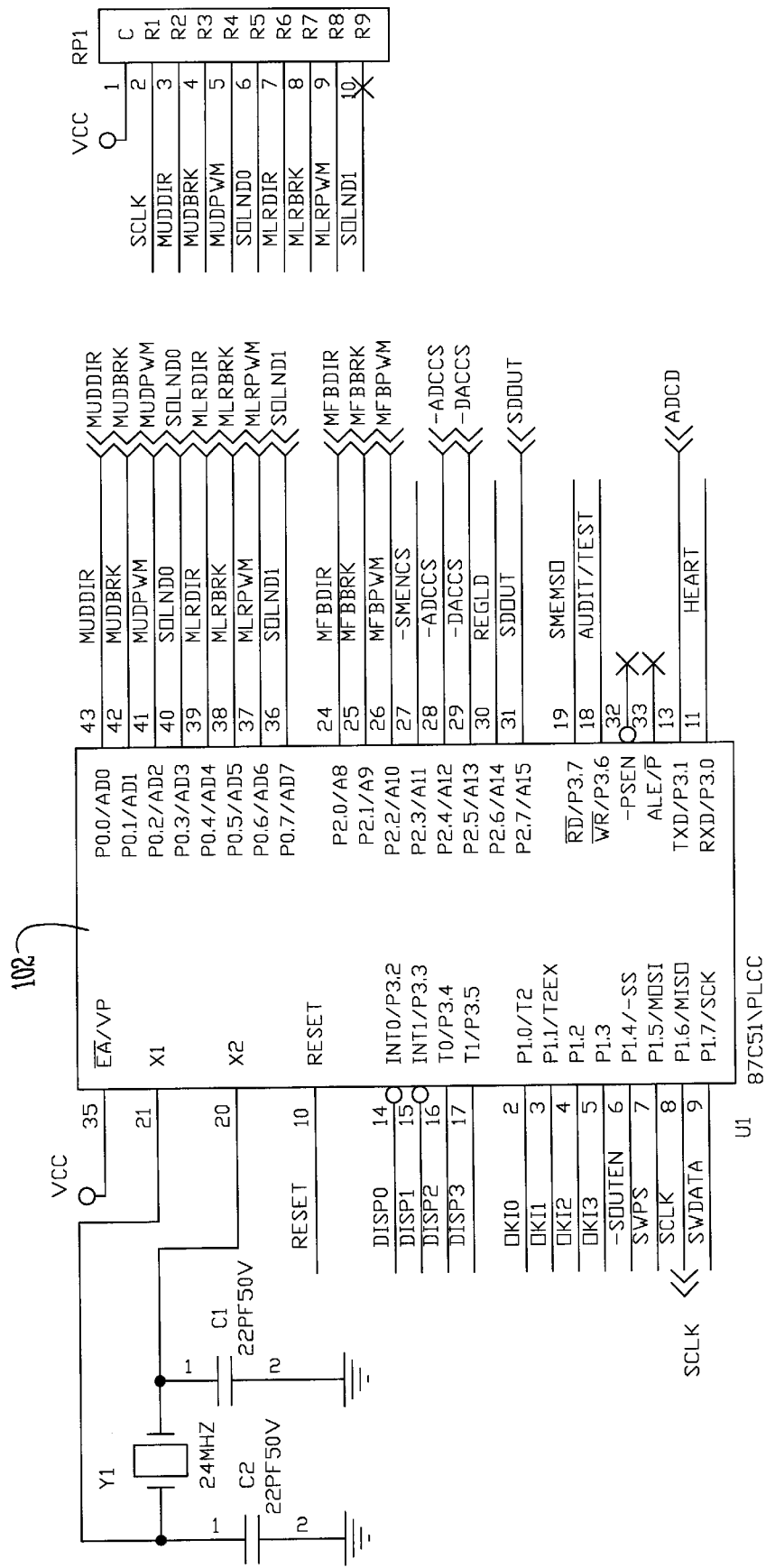
FIG. 9 is a detailed electrical schematic of the microcomputer of FIG. 8.
Figure 10:
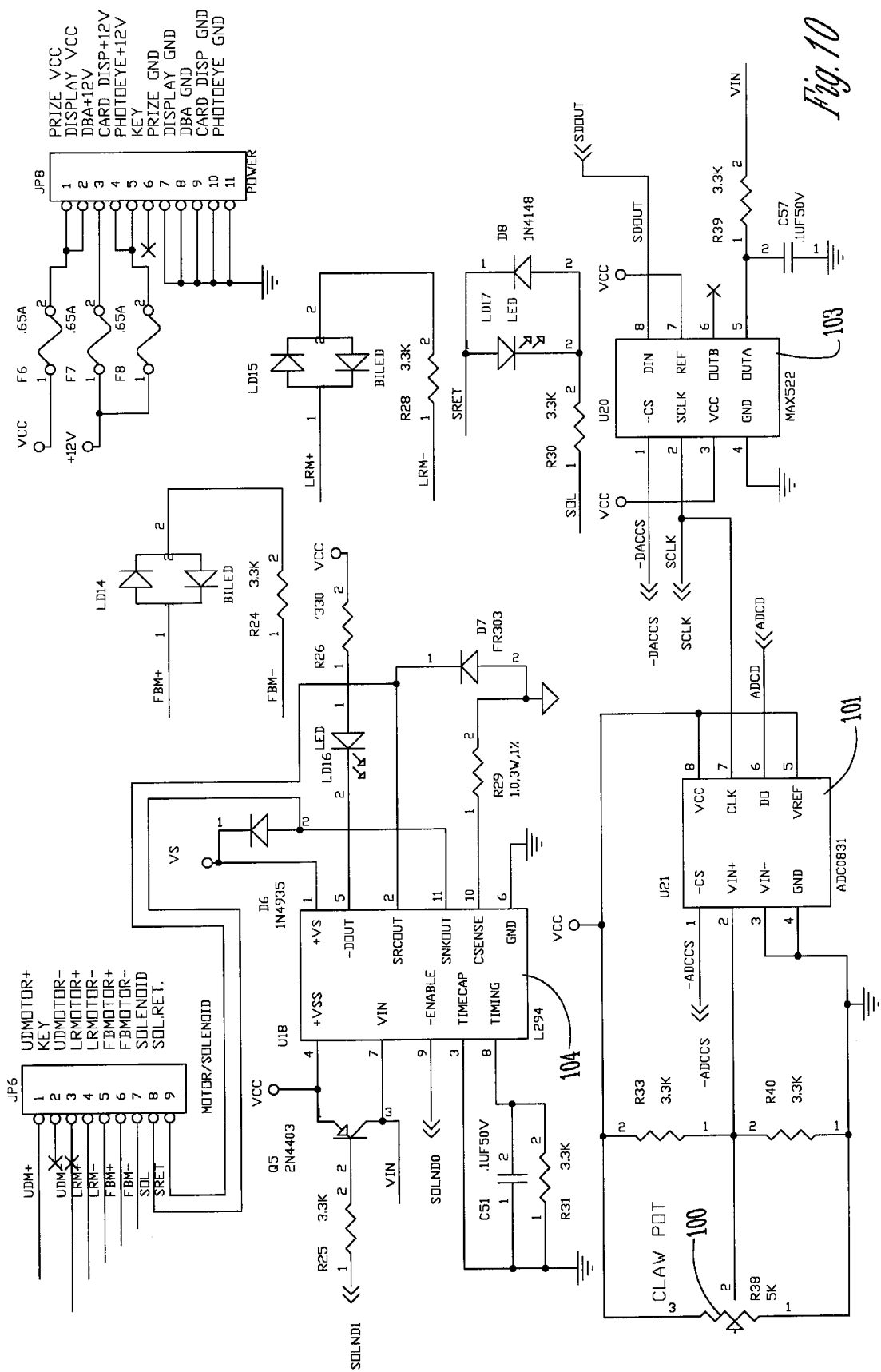
FIG. 10 is a detailed electrical schematic of the potentiometer, ADC, DAC, and solenoid driver of FIG. 8.

For example, FIG. 9 illustrates an example of a precise configuration for microcomputer 102. Here microcomputer 102 is an 87C51 available from Atmel Corporation under part #AT89C55. Microcomputer 102 can control other functions of game 10 but pertinent lines for control of claw gripping force are illustrated by referring also to FIG. 10, which is an example of a precise electrical schematic showing potentiometer 100, ADC 101, DAC 103, and solenoid driver 104, according to FIG. 8. Connector JP6 connects the output of solenoid driver 104 to solenoid 30.

In the preferred embodiment, ADC 101 can be an model number ADC0831, ADC0832, ADC0834, or ADC0838, 8 bit Serial I/O A/D Converter with Multiplexer Options available from National Semi-Conductor. DAC 103 can be a Maxim 522 Dual, 8-Bit, Voltage-Output Serial DAC in an 8-Pin SO Package available from Maxim Integrated Products of Sunnyvale, Calif. Solenoid driver 104 can be an L294 monolithic switched mode solenoid driver available from SGS Thompson Micro-Electronics of Agrate, Italy. The L294 works as a transconductance amplifier, supplying an output current directly proportional to an input voltage level.

Figure 11:
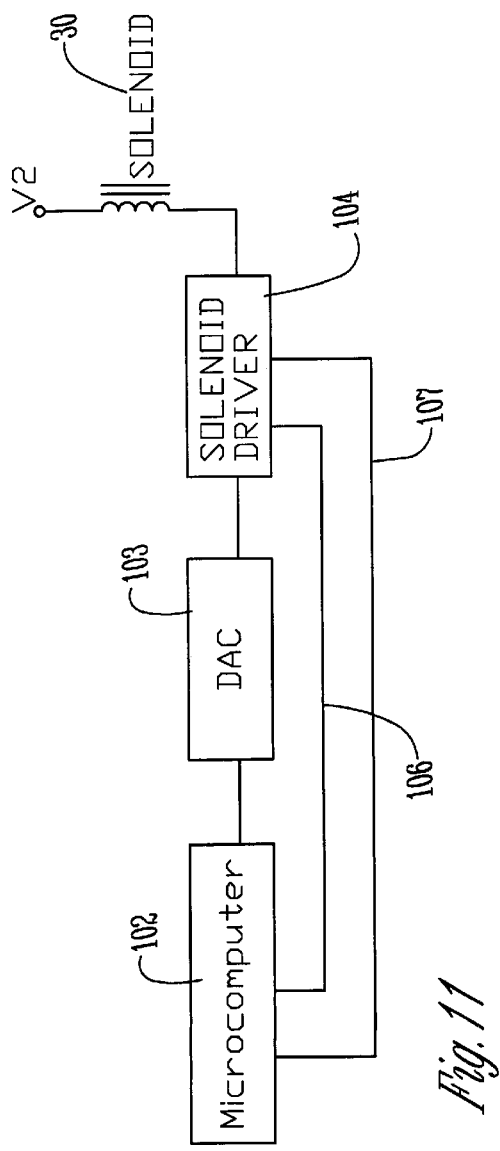
FIG. 11 is a block diagram of an alternative embodiment according to the present invention.
Figure 12:
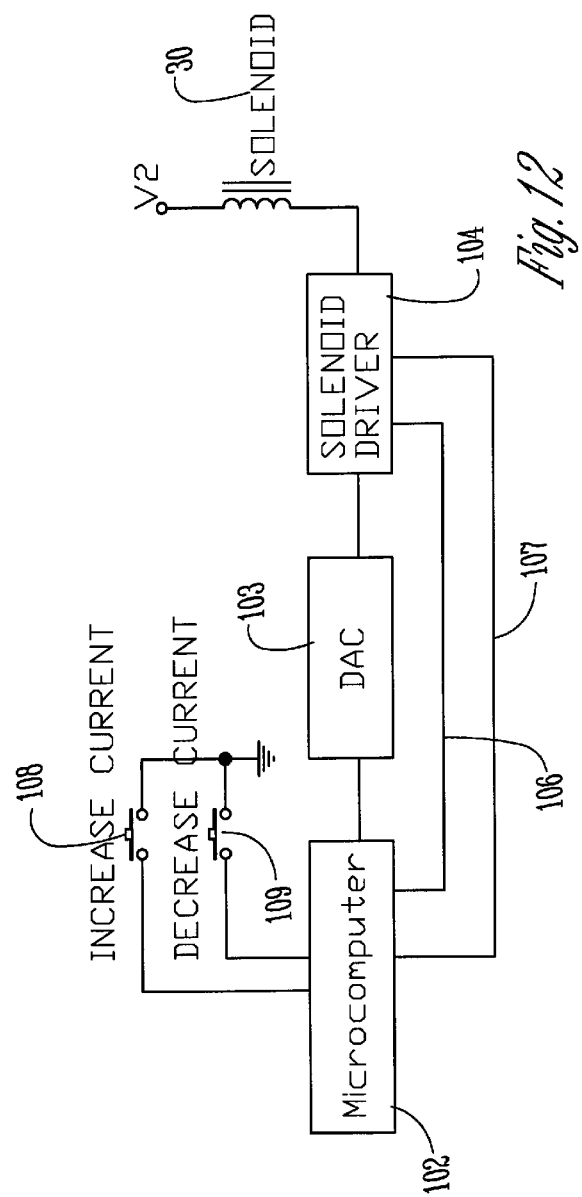
FIG. 12 is a block diagram of a still further alternative embodiment according to the present invention.

FIG. 11 shows an alternate embodiment, which is similar to FIG. 8, but does not have the potentiometer 100 and ADC 101 circuitry. In this case, the game is pre-programmed with the solenoid current value, which may vary as a function of game play and/or pay out level. FIG. 12 shows an alternate embodiment which, while also similar to FIG. 8, replaces the potentiometer 100 and ADC 101 with two switches 108 and 109. The operator uses these switches to set the solenoid current. Switch 108 increases it. Switch 109 decreases it. Only one switch might be used if the set value wraps around. It should be understood that these switches may be part of the player controls or they can be game owner controls used by the game owner when configuring the product.

Microcomputer 102 can be programmed, such as is within the skill of those skilled in the art, to perform the operations discussed above.

What is claimed is:

1. A crane game comprising:
   a moveable claw with closeable jaws;
   a solenoid connected to the claw to close the jaws and provide a gripping force related to an energizing force applied to the solenoid; and
   a solenoid driver electrically connected to the solenoid including a component to output a current to the solenoid proportional to a desired gripping force.

2. The game of claim 1 further comprising a housing, a coin or credit mechanism, a claw XYZ positioner, and a main controller.

3. The game of claim 1 further comprising a chamber in the housing which can contain items to be gripped by the claw.

4. The game of claim 1 wherein the solenoid comprises an electro-magnet and a ferromagnetic shuttle which moves in response to energization of the electro-magnet.

5. The game of claim 1 wherein the solenoid driver comprises a transconductance amplifier which converts a voltage input to a current output.

6. The game of claim 1 wherein the solenoid driver further comprises a feedback circuit.

7. The game of claim 1 further comprising an input device connected electrically to the solenoid driver and providing the solenoid driver a pre-determined input signal proportional to gripping force for the claw.

8. The game of claim 7 wherein the input signal comprises a voltage.

9. The game of claim 7 wherein the input device comprises a digital to analog converter.

10. The game of claim 7 further comprising a microprocessor connected to the input device.

11. The game of claim 10 wherein the microprocessor includes a memory for storing a digital value proportional to gripping force of the claw.

12. The game of claim 7 wherein the input device comprises a microprocessor with a pre-programmed input value proportional to claw gripping force.

13. The game of claim 7 wherein the input device comprises a selector having a plurality of selectable positions each having a value proportional to a different claw gripping force.

14. The game of claim 13 wherein the selector is connected to the microprocessor and the microprocessor is connected to a digital to analog converter.

15. The game of claim 13 wherein the input device comprises a potentiometer which is infinitely variable adjustable over a range of current values.

16. The game of claim 14 further comprising an analog digital converter connected to the potentiometer for reading the current through the potentiometer and converting it to a digital value.

17. The game of claim 15 further comprising a microprocessor connected to the analog digital converter.

18. The game of claim 16 wherein the microprocessor includes a control line connected to the solenoid driver for enabling the solenoid driver.

19. The game of claim 16 wherein the microprocessor includes a control line connected to the solenoid driver for driving the solenoid driver to a maximum.

20. A game apparatus comprising:
   a housing;
   an enclosed chamber in the housing where prizes can be placed;

a claw;

an X-Y-Z positioner connected to the claw;

a money or credit validator;

a delivery chute in the housing in communication with the chamber;

an electrical circuit;

an electrical actuator mechanically connected to the claw;

an actuator driver electrically connected to the circuit and to the actuator and issuing an electrical current proportional to desired claw gripping strength.

21. The apparatus of claim 20 further comprising a feedback circuit between the electrical actuator and the actuator driver.

22. The apparatus of claim 20 further comprising a microprocessor connected to a digital to analog converter for producing a voltage signal to the actuator driver which converts the voltage signal to a current.

23. A method of controlling a solenoid which controls gripping strength of a claw in a crane game machine to avoid problems caused by voltage surges, electrical noise, or voltage loads comprising:

selecting a desired gripping strength for the claw;

creating an electrical signal representative of said desired gripping strength; and delivering the signal to the solenoid as a current;

monitoring the current during a gripping period.

24. The method of claim 23 further comprising feeding back actual current level at the solenoid during the gripping period and adjusting the current to the solenoid based on the feedback.

25. A crane game comprising:

a moveable claw with closeable jaws;

a solenoid connected to the claw to close the jaws and provide a gripping force related to an energizing force applied to the solenoid; and a solenoid driver electrically connected to the solenoid including a component to output and maintain a current to the solenoid proportional to a desired gripping force.

26. The game of claim 25 further comprises a device to monitor electrical energization of the solenoid and use that measurement to control current to the solenoid.

27. The game of claim 26 wherein the device is a feedback circuit.

28. The game of claim 26 wherein the device is a compensation device which monitors current to the solenoid arid maintains the current substantially constant despite changes in resistance or voltage.

29. The game of claim 26 wherein the energizing force to the solenoid is variable to provide for a plurality of gripping forces.

30. The game of claim 29 wherein the current is maintained proportional to a selected gripping force.

31. A game apparatus comprising:

a housing;

an enclosed chamber in the housing where prizes can be placed;

a claw;

an X-Y-Z positioner connected to the claw;

a money or credit validator;

a delivery chute in the housing in communication with the chamber;

an electrical circuit;

an electrical actuator mechanically connected to the claw;

an actuator driver electrically connected to the circuit and to the actuator and issuing and maintaining to the electrical actuator a current proportional to desired claw gripping strength.

32. The apparatus of claim 31 further comprising a circuit to monitor current to the actuator to maintain the current to the actuator substantially constant for a desired claw gripping strength.

33. The apparatus of claim 31 further comprising a feedback circuit in the driver to receive and feedback the current to the actuator and control the current to the actuator.

34. The apparatus of claim 31 wherein the current is adjustable to present a plurality of gripping strengths.

35. The apparatus of claim 34 wherein the current is issued and maintained substantially constant and proportional to a selected gripping strength from the plurality of gripping strengths.

36. A method of controlling a solenoid which controls gripping strength of a claw in a crane game machine comprising:

selecting a desired gripping strength for the claw;

creating an electrical signal representative of the desired gripping strength; and delivering and maintaining a current to the solenoid based on the signal.

37. The method of claim 36 further comprising monitoring the current to the solenoid.

38. The method of claim 37 further comprising feeding back the current to the actuator and controlling the current to the actuator.

39. The apparatus of claim 36 wherein the current is adjustable to present a plurality of gripping stengths.

40. The apparatus of claim 39 wherein the current is issued and maintained substantially constant and proportional to a selected gripping strength from the plurality of gripping strength.

41. A method of controlling gripping strength of a claw in a crane game comprising:

utilizing a solenoid to cause a claw to grip at a gripping strength; and controlling the gripping strength of the claw by maintaining a current to the solenoid proportional to a desired gripping strength.

42. The method of claim 41 further comprising monitoring the current to the solenoid.

43. The method of claim 42 further comprising feeding back the current to the actuator and controlling the current to the actuator.

44. The apparatus of claim 41 wherein the current is adjustable to present a plurality of gripping strengths.

45. The apparatus of claim 44 wherein the current is issued and maintained substantially constant and proportional to a selected gripping strength from the plurality of gripping strengths.

46. A method of controlling gripping strength of a claw in a crane game comprising:

selecting an electrical current level associated with a gripping strength; and energizing a solenoid with the electrical current level to control gripping strength.

47. The method of claim 46 further comprising maintaining the gripping strength by maintaining the electrical current level.

48. The apparatus of claim 46 wherein the step of maintaining comprises monitoring the electrical current level and maintaining it.

* * * * *

UNITED STATES PATENT AND TRADEMARK OFFICE
CERTIFICATE OF CORRECTION

PATENT NO. : 6,283,475 B1
DATED : September 4, 2001
INVENTOR(S) : Stubben

Page 1 of 1

It is certified that error appears in the above-identified patent and that said Letters Patent is hereby corrected as shown below:

<u>Column 8,</u>
Line 35, please delete "strength" and insert -- strengths --

Signed and Sealed this

Twenty-first Day of May, 2002

Attest:

Attesting Officer

JAMES E. ROGAN
*Director of the United States Patent and Trademark Office*